UNITED STATES PATENT OFFICE.

ORRIN A. WHEELER, OF CHICAGO, ILLINOIS, ASSIGNOR OF ONE-THIRD TO EDWARD D. LOWENTHAL AND ONE-THIRD TO BERTHOLD LOWENTHAL, OF CHICAGO, ILLINOIS.

RECLAIMING RUBBER PRODUCTS.

1,049,955. Specification of Letters Patent. Patented Jan. 7, 1913.

No Drawing. Application filed October 26, 1910. Serial No. 589,200.

*To all whom it may concern:*

Be it known that I, ORRIN A. WHEELER, a citizen of the United States, and a resident of Chicago, in the county of Cook and State of Illinois, have invented certain new and useful Improvements in Reclaiming Rubber Products, of which the following is a full, clear, and exact description.

The invention relates to the manufacture of rubber compound or products and designs more particularly to utilize waste products containing cellulose and rubber, such as automobile tires, air-brake hose, etc.

Heretofore, it has been common practice in reclaiming rubber, to reduce or grind the material and to mechanically separate the cellulose from the rubber or to remove it by the action of a suitable acid or chemical treatment.

The present invention, as distinguished from the foregoing practice, designs to utilize both the cellulose and the rubber in the material to be reclaimed, so that in lieu of removing the cellulose, it will be utilized in the product containing the reclaimed stock, and this purpose is accomplished by converting the cellulose into a structureless plastic cellulose, which remaining in the product, will serve as an efficient filler or constituent of the product.

In carrying out the invention, the waste or scrap product containing cellulose, for example, pneumatic tires, air brake hose or any other product containing cellulose and rubber, is reduced to a pulverized state; then the mass, without separation of the cellulose from the rubber, is treated with a cellulose solvent, for example; cupra-ammonium or cupric-oxid ammonia. In practice, from one to three pounds of cupric-oxid ammonia will act as a solvent and treat about one pound of cellulose in the pulverized mass, and will render the cellulose plastic. After the cellulose has been rendered plastic in this manner, this mass is then placed in a de-vulcanizer and treated with steam. Next the mass is thoroughly washed to remove any unspent solvent in the mass. The mass can then be mixed with new rubber if desired or may be vulcanized without the addition of new rubber, according to the quality of the product desired, this step being performed in the usual manner as well understood in the art, for example: by adding sulfur to the mass and heating it. This mass containing the reclaimed rubber and cellulose which has been treated with a solvent to convert it to a plastic structureless mass forms a vulcanizable compound, which when vulcanized results in a hard rubber product, and in which the cellulose is so combined that the rubber with it will have maximum strength and the combined advantageous properties of hard rubber and cellulose, so that instead of the cellulose being an objectionable constituent, it will serve to render the product light and strong.

The invention thus provides an improved method by which rubber-products containing a cellulose, are reclaimed without removing the cellulose and in which the cellulose, in a plastic structureless state, remains in the reclaimed product to give the latter maximum strength and to act as a filler or rubber substitute which improves the product.

Having thus described the invention, what I claim as new and desire to secure by Letters Patent, is:

1. That improvement in reclaiming rubber containing cellulose, which consists in treating the cellulose with a solvent and arresting the treatment when the cellulose is coherent and tenacious, and leaving the cellulose in the rubber.

2. That improvement in reclaiming rubber containing cellulose, which consists in pulverizing the same, and then treating the pulverized mass with a cellulose solvent and arresting said treatment when the cellulose is coherent and tenacious, and without separating the cellulose from the rubber.

3. That improvement in reclaiming rubber containing cellulose, which consists in pulverizing the same, then treating the pulverized mass with a cellulose solvent and arresting said treatment when the cellulose is tenacious and coherent and without separating the cellulose from the rubber, and then vulcanizing the mass to form a hard rubber product.

4. That improvement in reclaiming rubber containing cellulose, which consists in treating the cellulose with cupra-ammonium, and arresting the treatment when said cellulose is coherent and tenacious and without separating the cellulose from the rubber.

5. A compound containing reclaimed rubber and cellulose which has been treated with a solvent to render it tenacious.

6. A hard rubber product containing reclaimed rubber cellulose which has been treated with a solvent to render it tenacious and coherent.

ORRIN A. WHEELER.

Witnesses:
 HILDUR C. PETERSEN,
 FRANK W. BENSON.

---

Copies of this patent may be obtained for five cents each, by addressing the "Commissioner of Patents, Washington, D. C."